United States Patent Office 2,857,246
Patented Oct. 21, 1958

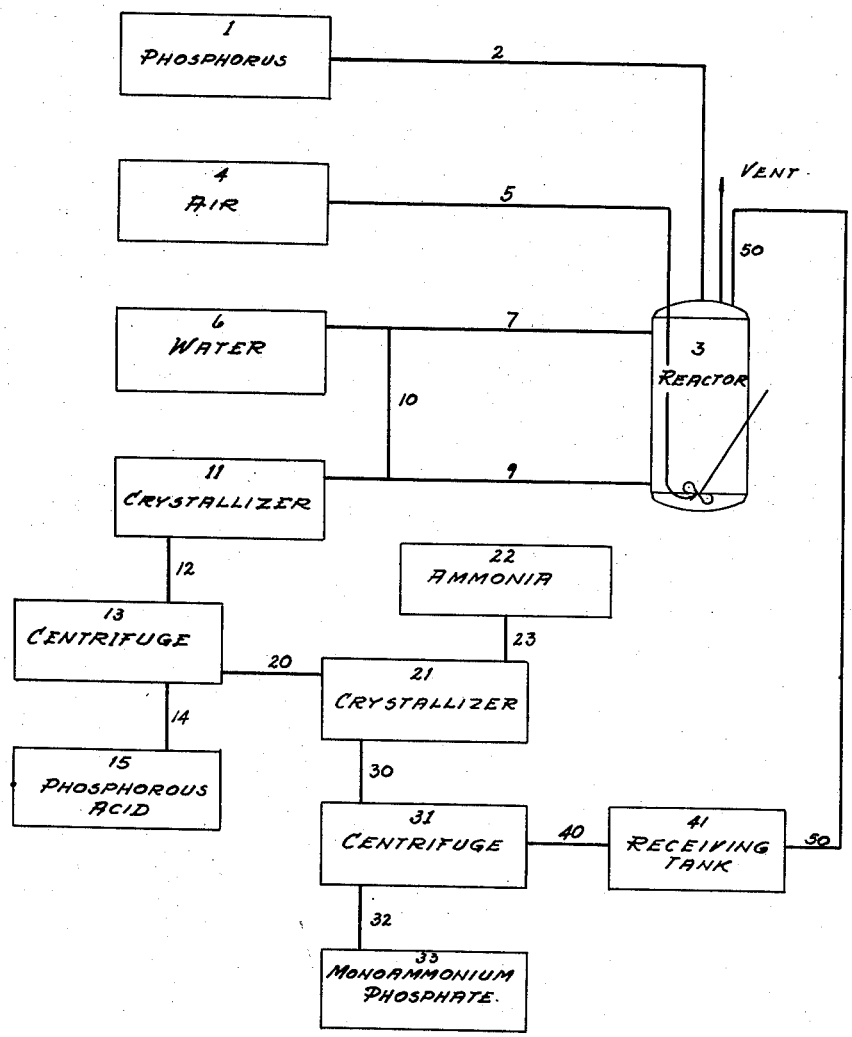

---

2,857,246

PROCESS FOR THE PURIFICATION OF PHOSPHOROUS ACID

John E. Malowan, Dayton, Ohio, assignor to Monsanto Chemical Company, St. Louis, Mo., a corporation of Delaware Application July 16, 1952, Serial No. 299,131

4 Claims. (Cl. 23—165)

This invention provides a process for purifying and separating phosphorous acid. It is an object of the invention to treat mixtures of phosphorous and phosphoric acids by a crystallization process to obtain pure phosphorous acid. It is a further object of the invention to remove phosphoric acid from admixture with phosphorous acid by reaction of the phosphoric acid with ammonia so as to form crystals of monoammonium phosphate and then removing the crystals of the monoammonium phosphate from the phosphorous acid.

The manufacture of phosphorous acid may be carried out by direct air oxidation of elemental phosphorus dispersed in a medium of phosphoric acid or phosphorous acid or mixtures thereof as described in copending application Serial No. 299,068, filed July 16, 1952, now abandoned, to R. S. Hudson and John W. Lefforge, which application is assigned to the same assignee as is the present case. Such oxidation results in the formation of a mixture of phosphorous and phosphoric acids. The resulting mixture may be used for many purposes wherein the presence of the phosphoric acid is not objectionable. It is, however, extremely difficult by prior art methods to separate the phosphorous acid from admixture with phosphoric acid when the former is desired in the pure state.

It has now been discovered that substantially pure crystalline phosphorous acid may be separated from mixtures containing at least 35% and preferably at least 45% by weight of phosphorous acid in admixture with phosphoric acid by cooling such mixtures to temperatures in the range of 15° C. to —15° C., a preferred temperature range being from 5° C. to —10° C. Water should be present in the concentration range of at least 2% but not in excess of 30% by weight, a preferred range being 10% to 25%, in the acid mixture. Selective crystallization of the phosphorous acid present in the mixture occurs, the crystals being substantially free of phosphoric acid. The crystalline phosphorous acid may be removed from the mother liquor either by centrifuging or filtering the crystal-containing slurry.

It has further been discovered that the mother liquor resulting from the above crystallization, and consisting of phosphoric acid together with some phosphorous acid may be treated to separate the phosphoric acid by reaction with ammonia. It has been found that the addition of ammonia in the amount required for the formation of monoammonium phosphate results in the preferential selective crystallization of monoammonium phosphate which is then separated by centrifuging or filtering. This process is applicable to all mixtures of the two acids, resulting in the removal of the phosphoric acid without appreciable reaction of the ammonium with the phosphorous acid present in the mixture. Under the conditions employed for such neutralization corresponding to pure monoammonium phosphate there is no precipitation of any phosphorous acid salt. The temperature employed in the crystallization of the monoammonium phosphate is 30° C. to —15° C., a preferred range being 5° C. to —10° C. The higher temperatures may be used with larger proportions of phosphoric acid in the mixture. Water may be present in the proportions stated above. While the present invention may be carried out upon mixture of phosphorous and phosphoric acid however derived, it is especially valuable in conjunction with the production of phosphorous and phosphoric acids from elemental phosphorus as described in said Hudson application. When so employed the mother liquor remaining after the crystallization of monoammonium phosphate, as described above, is returned to the reactor to serve as the medium for the oxidation of elemental phosphorus. When combined with the said Hudson process it is desirable to add sufficient water so as to hydrate the oxides of phosphorus which are formed to yield the mixture of phosphorous and phosphoric acids. If insufficient water has been added directly to the oxidation mixture to provide the required concentration of acids desired for crystallization of phosphorous acid, additional quantities of water may be added to the mixture of acids prior to crystallization.

In order to illustrate the invention a diagrammatic flow sheet of the present process is set forth in the accompanying drawing. In the drawing, numeral 1 represents a source of elemental phosphorus which flows by line 2 into reactor 3 having a vent and a stirrer and containing a mixture of phosphorous and phosphoric acids. The reactor is supplied with an oxygen-containing gas such as air from a source of supply 4. The air passes from source 4 into reactor 3 by means of line 5, terminating in a nozzle or gas disperser. Water is also supplied from tank 6 through pipe 7 to reactor 3. The phosphorus is oxidized by air in the reactor 3 and produces a mixture of phosphorous and phosphoric acids. A portion of the said reaction mixture is withdrawn from reactor 3 by means of line 9 to a crystallizer 11. If it is desired to introduce additional water into the crystal-containing slurry the water may be added by means of line 10 connecting with pipe 7 to water supply 6. The crystallization carried out in crystallizer 11 yields a slurry of crystalline phosphorous acid in a mother liquor of mixed acids. The slurry is withdrawn through line 12 into centrifuge 13 in which the phosphorous acid crystals are centrifuged and discharged by line 14 to product receiving vessel 15. After the centrifuging of the phosphorous acid crystals in centrifuge 13 the resulting mother liquor is withdrawn by means of pipe 20 and passes to crystallizer 21. Ammonia from a supply source 22 is introduced into crystallizer 21 by means of pipe 23. The ammonia reacts preferentially with the phosphoric acid present in the reaction mixture, resulting in the formation and crystallization of monoammonium phosphate. The resulting slurry of monoammonium phosphate crystals suspended in the acid mixture leaves crystallizer 21 by means of line 30 and passes to a centrifuge 31. A separation of monoammonium phosphate crystals from mother liquor is effected therein. The former are passed through conduit 32 to receiver 33. The mother liquor from centrifuge 31 leaves by line 40 to receiving tank 41. In order to carry out the recycle operation the residue acid in vessel 41 is conveniently returned to the reactor 3 by means of line 50 wherein the said acid serves as the reaction medium for the addition of elemental phosphorus which is then oxidized by an oxygen-containing gas. While a continuous process has been described above, the present method may also be operated as a batch process.

The following example illustrates in greater detail the method of practicing the instant invention.

A mixture of 1000 g. of phosphorous and phosphoric acids obtained from the oxidation of elemental phosphorus contained 48.5% by weight of phosphorous acid and 44.0% phosphoric acid, the remainder being largely water was fed to a crystallizer and cooled to a temperature of 5° C. The phosphorous acid was substantially the only component which crystallized at this point. The mixture was then centrifuged to separate 257 grams of crystalline phosphorous acid, which in the wet state as a crystalline mass contained about 91% phosphorous acid. The crystals were subsequently washed with dilute phosphorous acid to obtain pure phosphorous acid. Seven hundred and four grams of the mother liquor after the crystallization of phosphorous acid and the centrifuging step contained 32.4% phosphorous acid and 61.1% phosphoric acid. Anhydrous ammonia (80 grams) was then added to the mixture in the amount required to form monoammonium phosphate. The mixture was then cooled to 10° C., whereby crystallization of 463 g. of monoammonium phosphate took place. The addition of ammonia to crystallize out monoammonium phosphate has also been found to prevent any crystallization or precipitation of salts of phosphorous acid. The crystal-containing slurry was centrifuged to remove the crystals of the monoammonium phosphate. The resulting mother liquor, weighing 240 g. contained 63.6% phosphorous acid and 21.8% phosphoric acid. The above acid mixture was returned to the reactor for further treatment.

What is claimed is:

1. A process for the purification of a mixture of phosphorous acid, phosphoric acid and water, containing at least 35% of phosphorous acid, which comprises cooling the said mixture to a temperature below 15° C. to selectively crystallize the said phosphorous acid, selectively separating the crystalline phosphorous acid from the mother liquor, thereafter adding ammonia in approximately stoichiometric proportion to the said mother liquor to selectively crystallize monoammonium phosphate, and removing the monoammonium phosphate from the mother liquor whereby the concentration of phosphorous acid is increased in the said mother liquor.

2. A process for the purification of phosphorous acid, phoric acid and water, containing at least 35% phosphorous acid, which comprises cooling the said mixture to a temperature in the range of +5° C. to —10° C. to selectively crystallize phosphorous acid from the said mixture, removing the crystalline phosphorous acid, adding ammonia in approximately stoichiometric proportion to the remainder of the mixture to selectively crystallize monoammonium phosphate, and removing the said monoammonium phosphate.

3. A process for the purification of a mixture of phosphorous acid, phosphoric acid and water, containing at least 35% phosphorous acid, which comprises cooling the said mixture to a temperature in the range of +5° C. to —10° C. to selectively crystallize a portion of the said phosphorous acid, removing the said phosphorous acid from the said reaction mixture, adding ammonia in approximately stoichiometric proportion to the remainder of the reaction mixture, crystallizing monoammonium phosphate at a temperature in the range of 30° C. to —15° C., and removing the precipitated monoammonium phosphate.

4. A process which comprises oxidizing elemental phosphorus with an oxygen containing gas in the presence of water to obtain a mixture of phosphorous acid, phosphoric acid and water, containing at least 35% phosphorous acid, cooling the said acid mixture to a temperature below 15° C. to selectively crystallize the said phosphorous acid, separating the crystalline phosphorous acid from the mother liquor, thereafter adding ammonia in approximately stoichiometric proportion to the said mother liquor to selectively crystallize monoammonium phosphate, removing the precipitated monoammonium phosphate from the mother liquor, and returning the thus treated mother liquor to the reaction zone and adding phosphorous thereto for further oxidation to produce phosphorous and phosphoric acids.

References Cited in the file of this patent
UNITED STATES PATENTS

| | | |
|---|---|---|
| 1,208,877 | Wollenweber | Dec. 19, 1916 |
| 1,276,870 | Cameron | Aug. 27, 1918 |
| 1,593,514 | Sucky | July 20, 1926 |
| 1,879,189 | Gooch | Sept. 27, 1932 |
| 2,033,388 | Moose | Mar. 10, 1936 |
| 2,091,898 | Weber | Aug. 31, 1937 |

OTHER REFERENCES

Mellor: "Treatise on Inorganic Chemistry," Longmans, Green & Co., New York, 1928, vol. 8, pages 901 and 926, Fig. 27.

Berichte der Deutschen Chemischen Gesellschaft, Jahrg. 39–3, July 9–Oct. 3, 1906, page 2841.

Seidell: "Solubilities of Inorganic and Organic Compounds," D. Van Nostrand Co., Inc., N. Y., 1919, vol. 1, page 489.